United States Patent
Brogle et al.

(10) Patent No.: US 8,326,385 B2
(45) Date of Patent: Dec. 4, 2012

(54) MOBILE WIRELESS COMMUNICATIONS DEVICE WITH PROXIMITY BASED TRANSMITTED POWER CONTROL AND RELATED METHODS

(75) Inventors: Richard James Brogle, Waterloo (CA);
Tommy Chun Wah Ho, Waterloo (CA);
Roberto Gautier, Davie, FL (US)

(73) Assignee: Research In Motion Limited, Waterloo, Ontario (CA)

(*) Notice: Subject to any disclaimer, the term of this patent is extended or adjusted under 35 U.S.C. 154(b) by 0 days.

(21) Appl. No.: 13/080,333

(22) Filed: Apr. 5, 2011

(65) Prior Publication Data

US 2012/0258772 A1   Oct. 11, 2012

(51) Int. Cl.
*H04M 1/00* (2006.01)
(52) U.S. Cl. ............... 455/575.7; 455/550.1; 455/575.1; 455/575.5; 455/90.1; 455/90.3; 455/522
(58) Field of Classification Search ............... 455/550.1, 455/575.1, 575.5, 575.7, 90.1, 90.3, 522
See application file for complete search history.

(56) References Cited

U.S. PATENT DOCUMENTS

| | | | |
|---|---|---|---|
| 6,456,856 B1 | 9/2002 | Werling et al. | 455/550 |
| 6,657,595 B1 | 12/2003 | Phillips et al. | 343/702 |
| 7,053,629 B2 | 5/2006 | Nevermann | 324/644 |
| 7,146,139 B2 | 12/2006 | Nevermann | 455/115 |
| 7,511,513 B2 | 3/2009 | Nevermann | 324/644 |
| 7,606,590 B2 | 10/2009 | Karabinis | 455/522 |
| 7,656,964 B1 | 2/2010 | DeCoste et al. | 375/297 |
| 7,805,171 B2* | 9/2010 | Alameh et al. | 455/575.2 |
| 7,876,274 B2* | 1/2011 | Hobson et al. | 343/702 |
| 8,000,736 B2* | 8/2011 | Forstall et al. | 455/550.1 |
| 2004/0214621 A1* | 10/2004 | Ponce De Leon et al. | 455/575.8 |
| 2007/0238496 A1 | 10/2007 | Chung et al. | 455/575.7 |
| 2012/0142291 A1* | 6/2012 | Rath et al. | 455/127.1 |

FOREIGN PATENT DOCUMENTS

| | | |
|---|---|---|
| EP | 0752735 | 1/1997 |
| WO | WO 2009/149023 | 12/2009 |

* cited by examiner

*Primary Examiner* — Temica M Beamer
(74) *Attorney, Agent, or Firm* — Allen, Dyer, Doppelt, Milbrath & Gilchrist, P.A.

(57) ABSTRACT

A mobile wireless communications device may include a portable housing, at least one antenna carried by the portable housing, and at least one capacitive proximity sensor carried by the portable housing and configured to sense proximity of a human user adjacent thereto. The mobile wireless communications device may also include a wireless transmitter carried by the portable housing and coupled to the at least one antenna, and a controller carried by the portable housing and coupled to the wireless transmitter and the at least one capacitive proximity sensor. The controller may be configured to cooperate with the wireless transmitter to adjust transmitted power output from the at least one antenna based upon the at least one capacitive proximity sensor.

14 Claims, 6 Drawing Sheets

MOBILE WIRELESS COMMUNICATIONS DEVICE WITH PROXIMITY BASED TRANSMITTED POWER CONTROL AND RELATED METHODS

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing the layout of components for additional functionality and operational stability within the relatively limited amount of space available for the components.

Moreover, with the ever increasing trend towards smaller cell phone sizes with increased functionality, for a relatively small phone, it may be increasingly difficult for cellular device manufacturers to comply with certain requirements. For example, for a relatively small phone having an internal antenna, the antenna may be in relatively close proximity to the user's face or cheek, which may make complying with applicable SAR and/or hearing aid compatibility (HAC) requirements potentially difficult for manufacturers.

DETAILED DESCRIPTION

Figure 1:
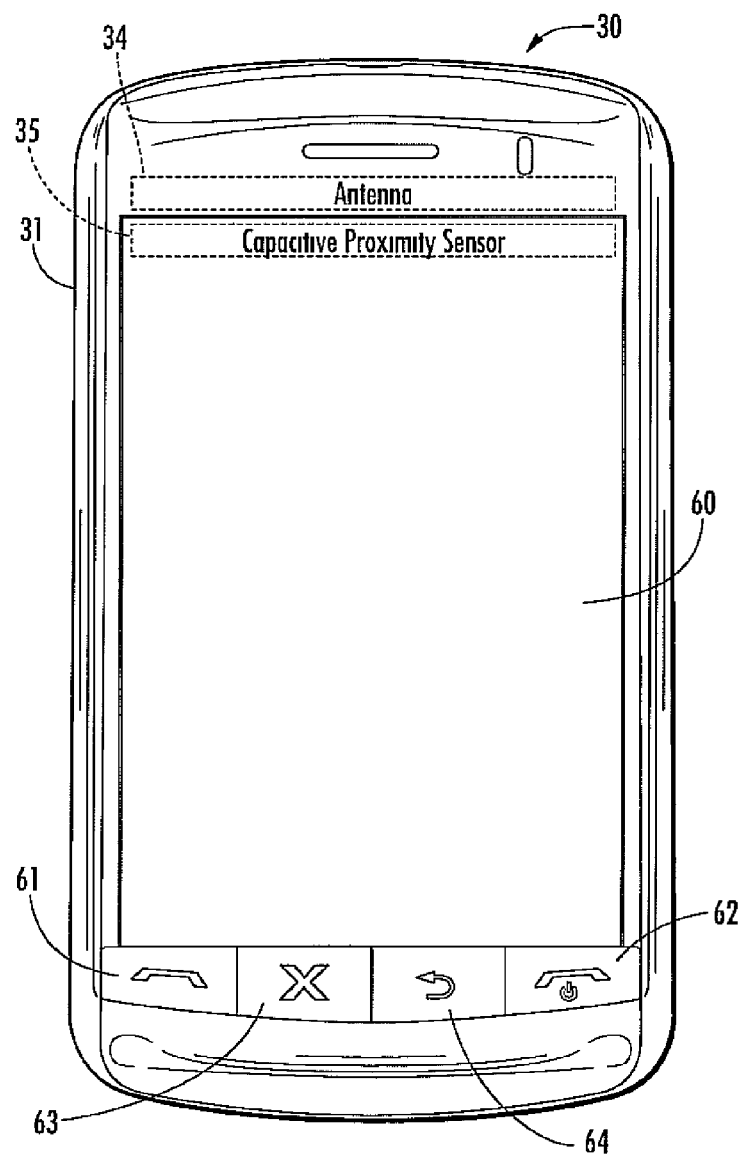
FIG. 1 is a top plan view of a mobile wireless communications device in accordance with one example embodiment.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with one exemplary aspect, a mobile wireless communications device may include a portable housing, at least one antenna carried by the portable housing, and at least one capacitive proximity sensor carried by the portable housing and configured to sense proximity of a human user adjacent thereto, for example. The mobile wireless communications device may also include a wireless transmitter carried by the portable housing and coupled to the at least one antenna, and a controller carried by the portable housing and coupled to the wireless transmitter and the at least one capacitive proximity sensor. The controller may be configured to cooperate with the wireless transmitter to adjust transmitted power output from the at least one antenna based upon the at least one capacitive proximity sensor, for example.

The at least one antenna may include a plurality of antennas. The at least one capacitive proximity sensor may include a plurality of capacitive proximity sensors corresponding to the plurality of antennas. The controller may be configured to cooperate with the wireless transmitter to adjust the transmitted power output at each of the plurality of antennas based upon a corresponding one of the plurality of capacitive proximity sensors, for example.

The mobile wireless communications may further include a display carried by the portable housing and coupled to the controller. The at least one capacitive sensor may include at least one capacitive proximity sensor on the display, for example.

The controller may be configured to adjust the transmitted power output to a reduced power level based upon sensing the human user immediately adjacent the at least one capacitive proximity sensor. Alternatively or additionally, the controller may be configured to adjust the transmitted power output to a full power level based upon sensing the human user spaced apart from the at least one capacitive proximity sensor, for example.

The at least one antenna and the at least one capacitive proximity sensor may be adjacent one another. The mobile wireless communications device may further include a substrate carrying the at least one antenna and the at one capacitive proximity sensor. The wireless transmitter comprises a cellular transmitter, for example.

A method aspect is directed to a method of adjusting transmitted power output from at least one antenna of a mobile wireless communications device that includes a portable housing carrying the at least one antenna, at least one capacitive proximity sensor, a wireless transmitter coupled to the at least one antenna, and a controller coupled to the wireless transmitter and the at least one capacitive proximity sensor. The method may include using the at least one capacitive sensor to sense proximity of a human user adjacent thereto, for example. The method may also include using the controller to cooperate with the wireless transmitter to adjust transmitted power output from the at least one antenna based upon the at least one capacitive proximity sensor, for example.

Figure 2:
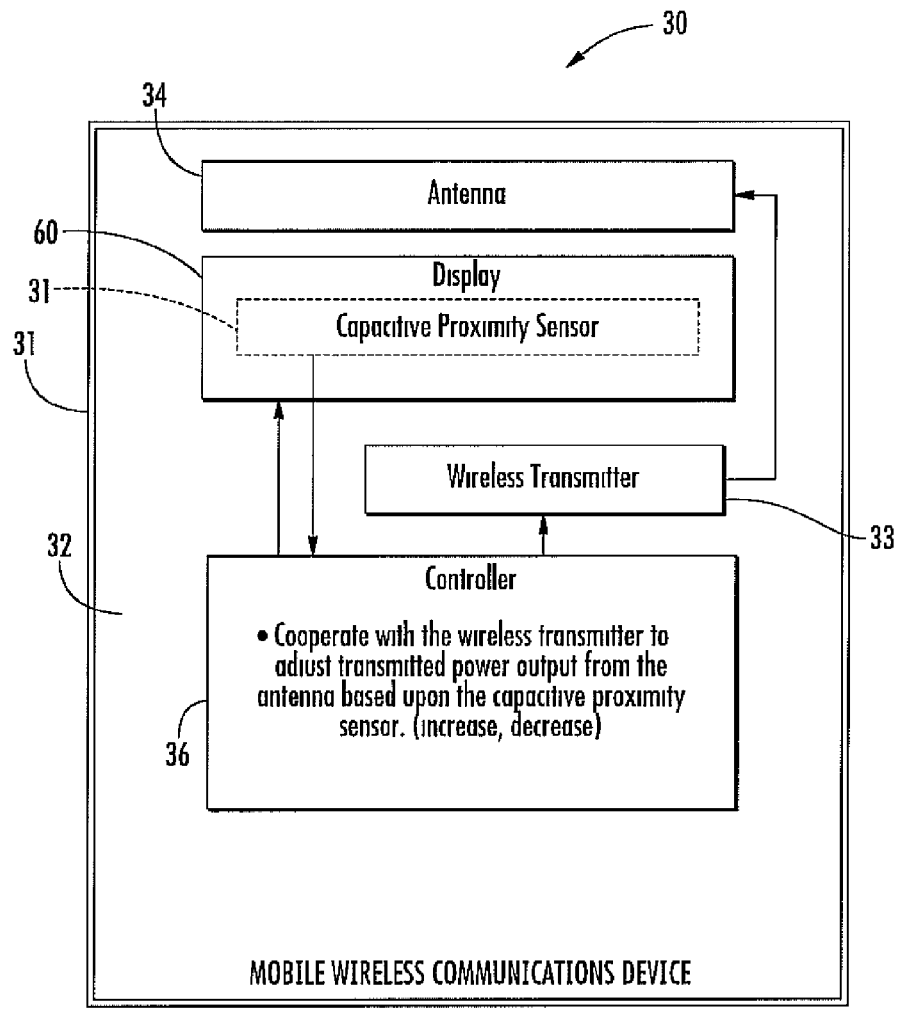
FIG. 2 is a schematic block diagram of the device of FIG. 1.

Referring now to FIGS. 1-3, a mobile wireless communications device 30 illustratively includes a portable housing 31. The portable housing 31 includes upper and lower portions. The mobile wireless communications device 30 also includes a substrate 32 also carried by the portable housing 31. The substrate 32 may be printed circuit board (PCB), for example, and may carry the components described herein. In some embodiments, not shown, where the substrate 32 is a PCB, the PCB may be replaced by or used in conjunction with a metal chassis or other substrate, for example a flexible substrate. The substrate 32 may also include a conductive layer (not shown) defining a ground plane.

The exemplary device 30 further illustratively includes a display 60 and a plurality of control keys including an "off hook" (i.e., initiate phone call) key 61, an "on hook" (i.e., discontinue phone call) key 62, a menu key 63, and a return or escape key 64. Operation of the various device components and input keys, etc., will be described further below with reference to FIG. 5. While the exemplary device 30 is a illustratively a mobile telephone, it will be appreciated by those skilled in the art the mobile wireless communications device may be another type of device, for example, a personal digital assistant (PDA), or a tablet personal computer.

A wireless transmitter 33 is carried by the portable housing 31. The wireless transmitter 33 may be cellular transmitter, for example. The wireless transmitter 33 may be another type of transmitter, for example, a wireless local area network (WLAN) transmitter, for example. Of course, the mobile wireless communications device 30 may include more than one wireless transmitter 33, and additional wireless communications circuitry, for example, wireless receivers, as will be appreciated by those skilled in the art.

The mobile wireless communications device 30 also includes an antenna 34 carried by the portable housing 31 and coupled to the wireless transmitter 33. The antenna 34 is illustratively carried by the upper portion of the portable housing 31. The antenna 34 may be carried by other part of the portable housing 31, for example, the lower portion. The type of antenna 34 may correspond to the type of wireless transmitter 33, for example. In other words, the antenna 34 may be configured to operate in the cellular frequency band. Additionally, the antenna 34 may be configured to operate in more than one frequency band, which may include, for example, the cellular frequency band, global positioning system (GPS) band, WLAN frequency band, and/or other frequency bands.

The mobile wireless communications device 30 also includes a capacitive proximity sensor 35 carried by the portable housing 31 and adjacent the antenna 34. More particularly, the capacitive proximity sensor 35 is on the display 60, for example, and the display may be a "touch screen display." The capacitive proximity sensor 35 may be aligned with the antenna 34. The capacitive proximity sensor 35 is configured to sense proximity of a human user 37 adjacent thereto. In other words, the capacitive sensing used for the touch screen display may also be used for sensing the proximity of the human user 37 adjacent thereto. As will be appreciated by those skilled in the art, the capacitive proximity sensor 35 may not be carried by or on the display 60, and may be carried elsewhere in the portable housing 31.

A controller 36 is carried by the portable housing 31 and coupled to the wireless transmitter 33 and the capacitive proximity sensor 35. The controller 36 may be implemented using hardware (e.g., memory, etc.) and software components, i.e., computer-readable instructions for causing the mobile device 30 to perform the various functions or operations described herein.

The controller 36 is configured to cooperate with the wireless transmitter 33 to adjust transmitted power output from the antenna 34 based upon the capacitive proximity sensor 35. In other words, the controller 36, based upon the sensed proximity of a human user 37, advantageously adjusts the transmitted power output. For example, the controller 36 is configured to reduce the transmitted power output to a reduced power level based upon sensing the human user 37 immediately adjacent the capacitive proximity sensor 35. This may be particularly advantageous to reduce the human user's exposure to radio frequency (RF) radiation to within acceptable limits, and thus increase SAR compliance. Additionally, RF performance degradation may be reduced. The controller 36 may also adjust the transmitted power output based upon the gain pattern of the antenna 34.

Figure 3A:
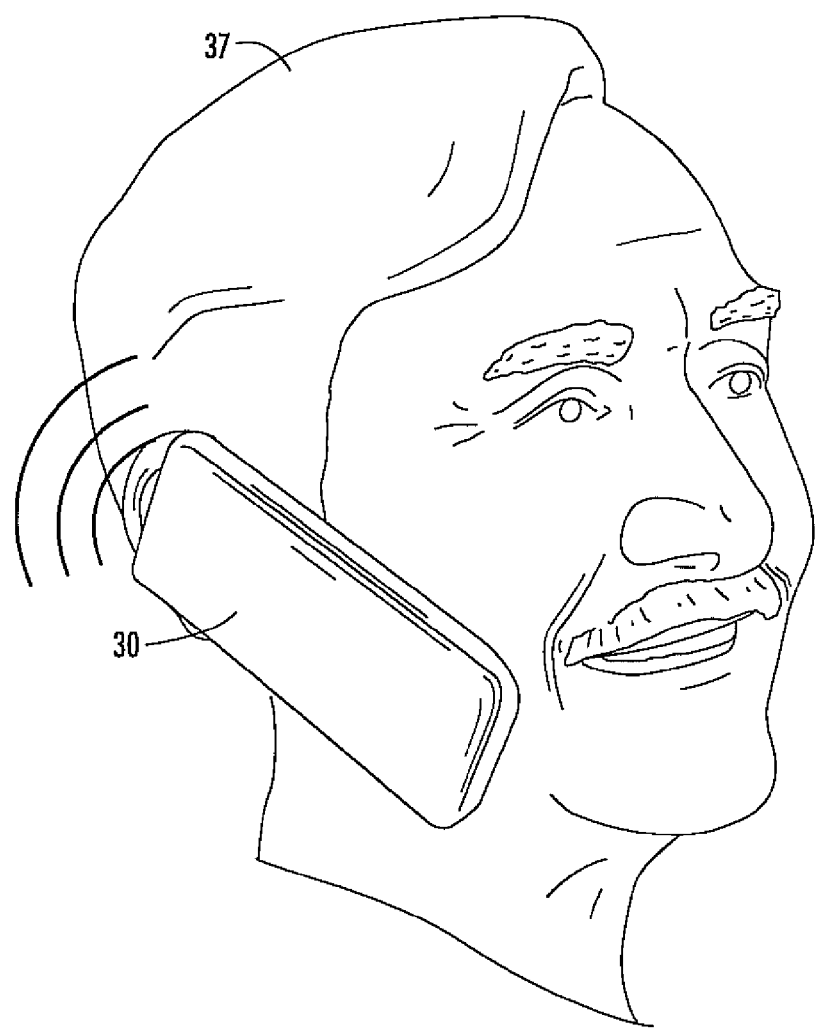
FIGS. 3a-3b are diagrams illustrating operation of the device in FIG. 1 adjacent and removed from the human user's head, respectively.

By way of example, suppose the mobile wireless communications device 30 is spatially separated from the human user, for example, on a table. The controller 36 cooperates with the wireless transmitter 33 to operate a maximum transmitted power output from the antenna 34. Upon the mobile wireless communications device 30 receiving a call, for example, the human user 37 picks up the device and places it adjacent their head (i.e. touching their cheek and ear or having a relatively small distance between their head and the device 30, for example, less than 6 inches) (FIG. 3a). The controller 36 cooperates with the wireless transmitter 33 to reduce the transmitted power output, for example, to an acceptable level to meet SAR requirements, for the given proximity of the human user to the capacitive proximity sensor 35 and the adjacent antenna 34.

Figure 3B:
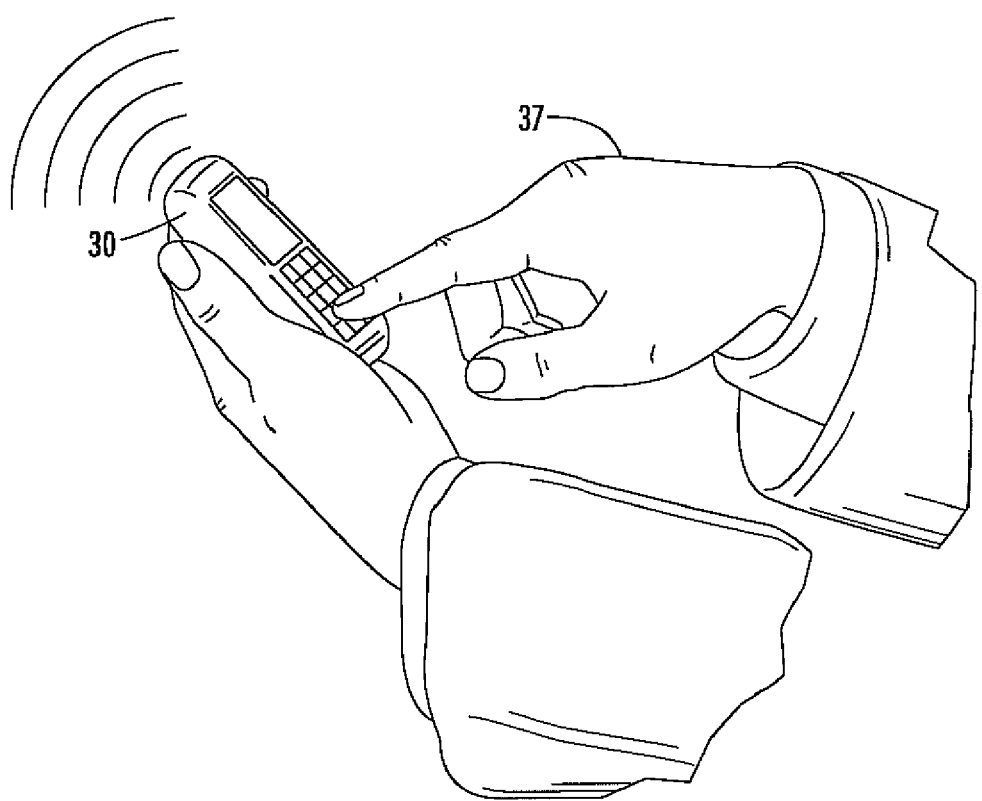

The controller 36 is also configured to increase the transmitted power output to within a threshold power level based upon sensing the human user 37 being separated from the capacitive proximity sensor 35 (FIG. 3b). By way of the above example, suppose the human user 37 places the call on "speakerphone" or begins to write an email or type a text message, the human user will typically remove the mobile wireless communications device 30 from adjacent their head to an arm's length distance, for example, 24 to 30 inches. The capacitive proximity sensor 35 detects that it is no longer adjacent the human user 37. The controller 36 cooperates with the wireless transmitter 33 to increase the transmitted power output, for example, to an acceptable level or full power level, to meet SAR requirements, for the given proximity of the human user 37 to the capacitive proximity sensor 35 and the adjacent antenna 34. Other distances detected by the capacitive proximity sensor 35 may correspond to other transmitted power levels as will be appreciated by those skilled in the art.

Figure 4:
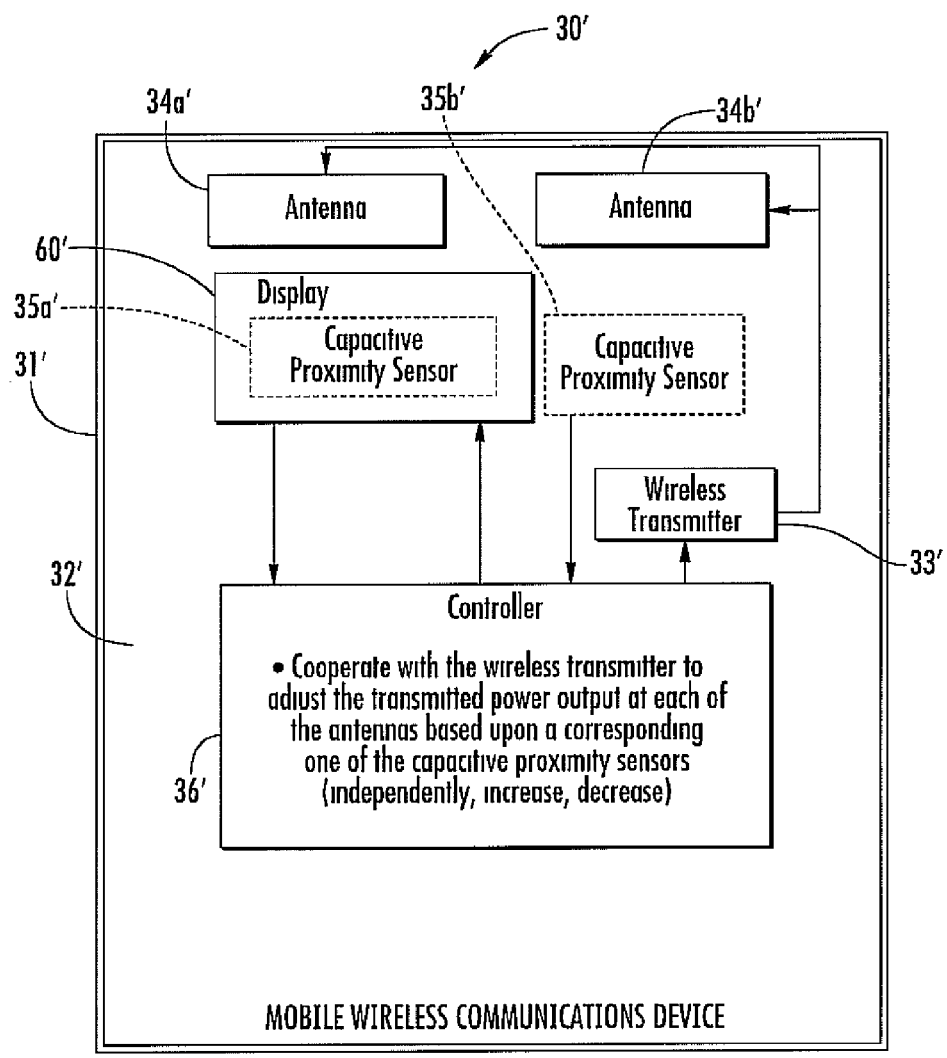
FIG. 4 is a schematic block diagram of another embodiment of a mobile wireless communications device in accordance with an example embodiment.

Referring now to FIG. 4, in another example embodiment, the mobile wireless communications device 30' includes multiple antennas 34a'-34b' carried by the upper portion of the portable housing 31'. The antennas 34a'-34b' may be carried by different portions of the portable housing 31'. For example, an antenna 34a' may be carried by the top portion of the portable housing 31', while the second antenna 34b' may be carried by the bottom portion of the portable housing. Of course, the mobile wireless communications device 30' may include more than two antennas, and they may be carried by the same portion of the portable housing 31'.

The mobile wireless communications device 30' also includes multiple capacitive proximity sensors 35a'-35b'. One capacitive proximity sensor 35a' is carried by the display 60', and another capacitive proximity sensor 35b' is not carried by the display. Of course, both capacitive proximity sensors 35a'-35b' may be carried by the display 60', or none of the capacitive proximity sensors may be carried by the display. The capacitive proximity sensors 35a'-35b' correspond to the antennas 34a'-34b'. In some embodiments, additional proximity sensors may be used in conjunction with the capacitive proximity sensors 35a'-35b', and may be another type of proximity sensor, for example, they may be infrared and/or voltage standing wave ratio (VSWR) based. The capacitive proximity sensors 35a'-35b' may be carried elsewhereby the portable housing 31' and adjacent corresponding ones of the antennas 34a'-34b'.

The controller 36' is configured to cooperate with the wireless transmitter 33' to adjust the transmitted power output at each of the antennas 34a'-34b' based upon a corresponding one of the capacitive proximity sensors 35a'-35b'. In some embodiments, the controller 36' may adjust each of the antennas 34a'-34b' independently.

As will be appreciated by those skilled in the art, a base station (not shown) may set or adjust the overall power level for the device 30' or all the antennas 34a'-34b' to permit frequency reuse in adjacent cells. Additionally, the antennas 34a'-34b' may have different gain patterns. Thus, the controller 36' may further adjust the transmitted power of each of the antennas 34a'-34b' based upon a corresponding one of the capacitive proximity sensors 35a'-35b', and/or the different gain patterns, for example.

A method aspect is directed to a method of adjusting transmitted power output from an antenna 34 of a mobile wireless communications device 30 that includes a portable housing 31 carrying the antenna, a capacitive proximity sensor 35, a wireless transmitter 33 coupled to the antenna 34, and a controller 36 coupled to the wireless transmitter and the capacitive proximity sensor. The method includes using the capacitive sensor 35 to sense proximity of a human user adjacent thereto. The method also includes using the controller 36 to cooperate with the wireless transmitter 33 to adjust transmitted power output from the antenna 33 based upon the capacitive proximity sensor 35.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
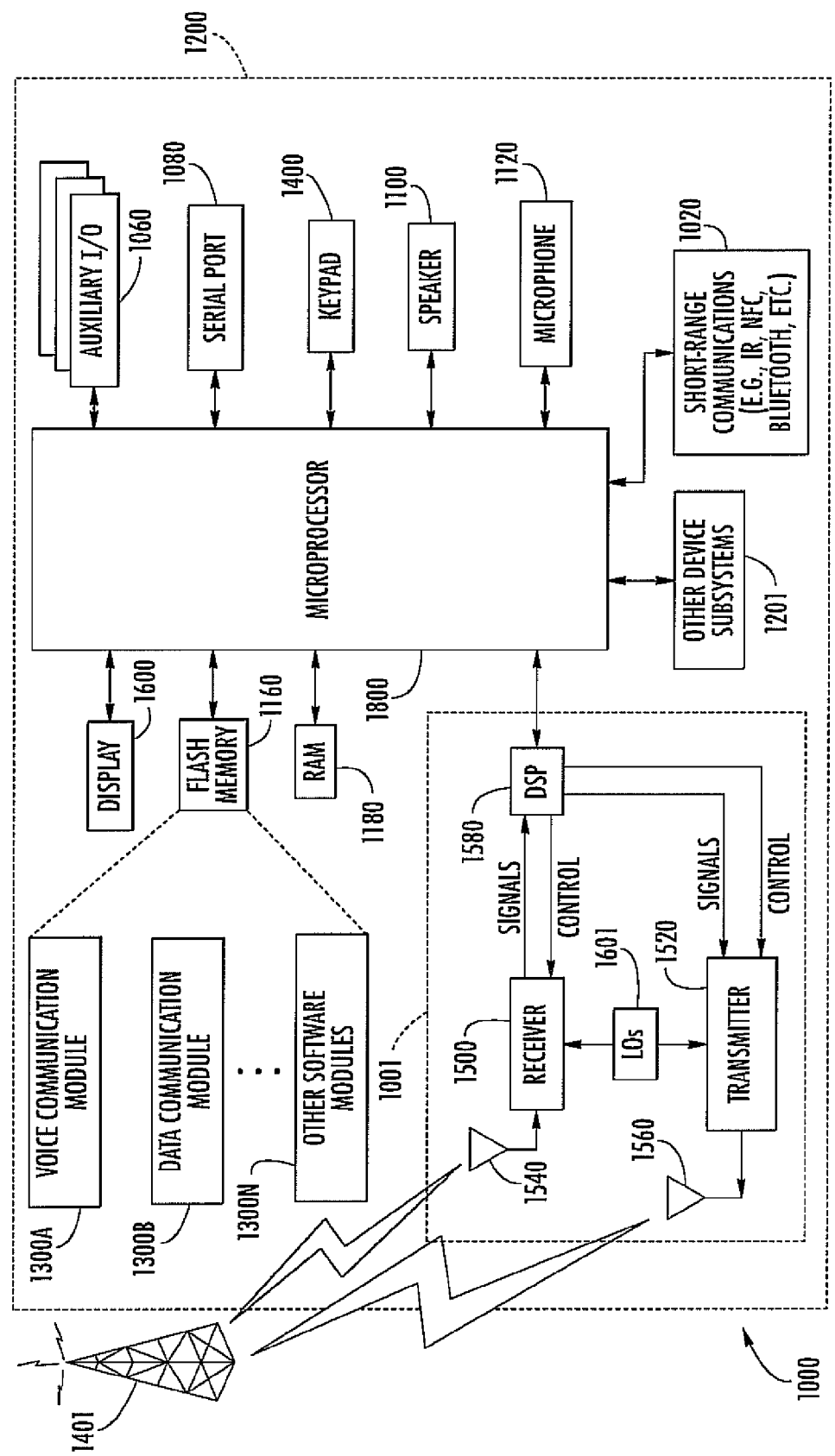
FIG. 5 is a schematic block diagram illustrating additional components that may be included in the mobile wireless communications device of FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, COMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A mobile wireless communications device comprising:
a portable housing;
a plurality of antennas carried by said portable housing;
a respective capacitive proximity sensor coupled to each of said plurality of antennas, carried by said portable housing and configured to sense proximity of a human user adjacent thereto;
a wireless transmitter carried by said portable housing and coupled to said at least one antenna; and
a controller carried by said portable housing and coupled to said wireless transmitter and said capacitive proximity sensors, and configured to
cooperate with said wireless transmitter to adjust transmitted power output at each of said plurality of antennas based upon the respective capacitive proximity sensor, and
adjust the transmitted power output at each of said plurality of antennas to a reduced power level based upon sensing the human user immediately adjacent at least one of said capacitive proximity sensors.

2. The mobile wireless communications device of claim 1, further comprising a display carried by said portable housing and coupled to said controller; and wherein at least one of said capacitive proximity sensors comprises capacitive proximity sensor on said display.

3. The mobile wireless communications device of claim 1, wherein said controller is further configured to adjust the transmitted power output to a full power level based upon sensing the human user spaced apart from at least one of said capacitive proximity sensors.

4. The mobile wireless communications device of claim 1, further comprising a substrate carrying said plurality of antennas and said capacitive proximity sensors.

5. The mobile wireless communications device of claim 1, wherein said wireless transmitter comprises a cellular transmitter.

6. A mobile wireless communications device comprising:
a portable housing;
a display carried by said portable housing;
a plurality of antennas carried by said portable housing;
a plurality of capacitive proximity sensors adjacent corresponding ones of said plurality of antennas and carried by said portable housing, and each configured to sense proximity of a human user adjacent thereto, at least one of said plurality of capacitive proximity sensors on said display;
a wireless transmitter carried by said portable housing and coupled to said plurality of antennas; and
a controller carried by said portable housing and coupled to said wireless transmitter, said display, and said plurality of capacitive proximity sensors, and configured to cooperate with said wireless transmitter to adjust transmitted power output from said plurality of antennas based upon said plurality of capacitive proximity sensors.

7. The mobile wireless communications device of claim 6, wherein said controller is configured to adjust the transmitted power output to below a reduced power level based upon sensing the human user immediately adjacent at least one of said plurality of capacitive proximity sensors.

8. The mobile wireless communications device of claim 6, wherein said controller is configured to adjust the transmitted power output to a full power level based upon sensing the human user spaced apart from at least one of said plurality of capacitive proximity sensors.

9. The mobile wireless communications device of claim 6, wherein said wireless transmitter comprises a cellular transmitter.

10. A method of adjusting transmitted power output from a plurality of antennas of a mobile wireless communications device comprising a portable housing carrying the plurality of antennas, a respective capacitive proximity sensor coupled to each of the plurality of antennas, a wireless transmitter coupled to the plurality of antennas, and a controller coupled to the wireless transmitter and the capacitive proximity sensors, the method comprising:
using the capacitive proximity sensors to sense proximity of a human user adjacent thereto; and
using the controller to
cooperate with the wireless transmitter to adjust transmitted power output at each of the plurality of antennas based upon its respective capacitive proximity sensor, and
adjust the transmitted power output at each of the plurality of antennas to a reduced power level based upon sensing the human user immediately adjacent at least one of the capacitive proximity sensors.

11. The method of claim 10, wherein the mobile wireless communications device further comprises a display carried by the portable housing and coupled to the controller; and wherein at least one of the capacitive proximity sensors comprises at least one capacitive proximity sensor on the display.

12. The method of claim 10, wherein the controller further adjusts the transmitted power output to a full power level based upon sensing the human user spaced apart from at least one of the capacitive proximity sensors.

13. The method of claim 10, wherein each of the plurality of antennas and its respective capacitive proximity sensor are adjacent one another.

14. The method of claim 10, wherein the wireless transmitter comprises a cellular transmitter.

* * * * *